US012129591B2

(12) United States Patent
Dirnberger et al.

(10) Patent No.: US 12,129,591 B2
(45) Date of Patent: Oct. 29, 2024

(54) DOOR LATCH FOR A DOMESTIC ELECTRICAL APPLIANCE AND METHOD FOR MOUNTING SUCH A DOOR LATCH

(71) Applicant: emz-Hanauer GmbH & Co. KGaA, Nabburg (DE)

(72) Inventors: Albert Dirnberger, Neunburg v. W. (DE); Michael Koch, Schmidgaden (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 883 days.

(21) Appl. No.: 17/069,001

(22) Filed: Oct. 13, 2020

(65) Prior Publication Data

US 2021/0123181 A1 Apr. 29, 2021

(30) Foreign Application Priority Data

Oct. 24, 2019 (DE) ......................... 102019007428.9

(51) Int. Cl.

| | |
|---|---|
| ***E05B 9/08*** | (2006.01) |
| ***D06F 39/14*** | (2006.01) |
| ***E05C 19/00*** | (2006.01) |
| *A47L 15/42* | (2006.01) |
| *D06F 58/20* | (2006.01) |
| *E05B 65/10* | (2006.01) |

(Continued)

(52) U.S. Cl.

CPC ................ *D06F 39/14* (2013.01); *E05B 9/08* (2013.01); *E05C 19/008* (2013.01); *A47L 15/4259* (2013.01); *D06F 58/20* (2013.01); *E05C 3/12* (2013.01); *E05C 19/10* (2013.01); *E05Y 2600/40* (2013.01); *E05Y 2600/52* (2013.01); *E05Y 2600/628* (2013.01); *E05Y 2900/312* (2013.01)

(58) Field of Classification Search

CPC .... Y10S 292/38; Y10S 292/51; Y10S 292/53; Y10S 292/69; Y10T 292/03; E05B 9/08

See application file for complete search history.

(56) References Cited

U.S. PATENT DOCUMENTS

| | | | |
|---|---|---|---|
| 780,192 | A | 1/1905 | Jones |
| 2,772,106 | A | 11/1956 | Semelka |

(Continued)

FOREIGN PATENT DOCUMENTS

| | | | |
|---|---|---|---|
| CN | 101666028 | A | 3/2010 |
| DE | 3426738 | A1 | 1/1986 |

(Continued)

OTHER PUBLICATIONS

DE Exam Report in co-pending application DE 10 2019 007 428.9 mail date May 14, 2020.

*Primary Examiner* — Carlos Lugo
(74) *Attorney, Agent, or Firm* — Hayes Soloway PC

(57) ABSTRACT

A latch module has an insertion mouth for receiving a closing member on closing of a door of a domestic appliance. Two collar portions which project away from one another are formed on both sides of the insertion mouth. Beneath a first of the collar portions there is formed a first recess, and beneath the second of the collar portions there is formed a second recess, which in some exemplary embodiments has two steps, where a first, less deep step is formed by a first lateral wall sub-portion and a second, deeper step is formed by a second lateral wall sub-portion.

11 Claims, 5 Drawing Sheets

(51) Int. Cl.
*E05C 3/12* (2006.01)
*E05C 19/10* (2006.01)

(56) References Cited

U.S. PATENT DOCUMENTS

| | | | |
|---|---|---|---|
| 2,837,361 A | 6/1958 | Loeb | |
| 2,857,191 A | 10/1958 | Buchholtz | |
| 3,260,813 A | 7/1966 | Dargene | |
| 3,765,194 A | 10/1973 | Moore | |
| 4,351,288 A | 9/1982 | Gasloli | |
| 4,907,831 A | 3/1990 | Di Giusto | |
| 4,917,413 A * | 4/1990 | Jason | E05C 19/066 292/87 |
| 5,046,771 A * | 9/1991 | Dedrich | E05B 79/12 292/DIG. 56 |
| 5,062,668 A | 11/1991 | Onderka et al. | |
| 5,176,417 A | 1/1993 | Bauer | |
| 5,419,305 A | 5/1995 | Hanley | |
| 5,494,325 A | 2/1996 | Liu et al. | |
| 5,997,056 A | 12/1999 | Yamagishi | |
| 6,082,787 A * | 7/2000 | Chioffi | D06F 37/42 292/341.15 |
| 6,155,616 A | 12/2000 | Akright | |
| 6,279,972 B1 | 8/2001 | Brill et al. | |
| 6,290,270 B1 | 9/2001 | Spiessl | |
| 6,390,320 B2 * | 5/2002 | Hurst | H05K 9/0073 220/241 |
| 6,390,518 B1 | 5/2002 | Elick | |
| 6,739,633 B2 | 5/2004 | Holloway et al. | |
| 6,913,296 B2 | 7/2005 | Bassi | |
| 7,032,939 B2 | 4/2006 | Magnusson | |
| 7,210,711 B2 | 5/2007 | Dirnberger et al. | |
| 7,299,666 B2 | 11/2007 | Geyer et al. | |
| 7,299,809 B2 | 11/2007 | Kang | |
| 8,736,406 B2 | 5/2014 | Hapke et al. | |
| 8,991,877 B2 | 3/2015 | Spiessl | |
| 2002/0056997 A1 | 5/2002 | Bassi | |
| 2003/0160461 A1 | 8/2003 | Promutico | |
| 2005/0194795 A1 | 9/2005 | Hapke et al. | |
| 2006/0101869 A1 | 5/2006 | Osvatic | |
| 2008/0042447 A1 | 2/2008 | Neumann | |
| 2009/0039657 A1 * | 2/2009 | Schuck | D06F 39/14 292/300 |
| 2011/0057460 A1 | 3/2011 | Onofrio | |
| 2015/0191932 A1 | 7/2015 | Bicic | |
| 2016/0138809 A1 | 5/2016 | Colucci et al. | |
| 2016/0251881 A1 | 9/2016 | Dirnberger et al. | |

FOREIGN PATENT DOCUMENTS

| | | | | |
|---|---|---|---|---|
| DE | 3919458 A1 | 12/1990 | | |
| DE | 19601230 A1 | 7/1997 | | |
| DE | 19837248 A1 | 2/2000 | | |
| DE | 102004060607 B3 | 3/2006 | | |
| DE | 102007025295 A1 | 12/2007 | | |
| DE | 102006058322 A1 | 6/2008 | | |
| DE | 102006037494 B4 | 7/2008 | | |
| DE | 102007033451 B4 | 9/2011 | | |
| DE | 10 2010 051 518 A1 | 5/2012 | | |
| DE | 112013001777 T5 | 2/2015 | | |
| DE | 202015100627 U1 | 6/2015 | | |
| DE | 102015002538 B3 | 3/2016 | | |
| EP | 869242 A1 * | 10/1998 | | E05B 65/087 |
| EP | 1344486 A2 | 9/2003 | | |
| EP | 1418266 A2 | 5/2004 | | |
| EP | 1681386 A1 * | 7/2006 | | D06F 39/14 |
| EP | 1936018 A1 * | 6/2008 | | D06F 37/18 |
| EP | 1460163 B1 | 1/2009 | | |
| EP | 1 544 387 B1 | 12/2010 | | |
| EP | 2 367 997 B1 | 5/2013 | | |
| EP | 1 975 300 B1 | 8/2015 | | |
| JP | 2008-274741 A | 11/2008 | | |
| PL | B61358 A | 10/2004 | | |
| WO | 02/34994 A1 | 5/2002 | | |
| WO | 2006/063684 A1 | 6/2006 | | |
| WO | 2011109235 A1 | 9/2011 | | |
| WO | 2011132213 A1 | 10/2011 | | |
| WO | 2013109585 A2 | 7/2013 | | |
| WO | 2013/150410 A1 | 10/2013 | | |
| WO | 2019/010020 A1 | 1/2019 | | |

* cited by examiner

DOOR LATCH FOR A DOMESTIC ELECTRICAL APPLIANCE AND METHOD FOR MOUNTING SUCH A DOOR LATCH

BACKGROUND OF THE INVENTION

1. Field of the Invention

The present invention relates generally to a door latch for a domestic electrical appliance and relates further to the mounting of such a door latch on a mounting wall of the domestic appliance.

2. Description of the Prior Art

Conventional domestic electrical appliances such as, for example, washing machines, dishwashers, tumble dryers, baking ovens, microwave ovens and the like are conventionally equipped with a door latch for keeping closed a door of the domestic appliance, which permits access to a working chamber thereof (for example in the case of a washing machine to a washing chamber in a washing drum), after the door has been closed. Conventional door latches have a latch assembly group which is composed of a plurality of individual components and pre-assembled to form a structural unit and which, on closing of the door, cooperates with a closing member, for example in the form of a pivotable closing hook or in the form of a fixed closing shackle, which enters an insertion mouth of the latch assembly group and holds it in place. The closing member is, for example, attached to the door of the domestic appliance, whereby the latch assembly group is then attached to a main body (carcass) of the domestic appliance containing the working chamber, or vice versa.

Regardless of whether the latch assembly group is attached to the main body or to the door of the domestic appliance, the latch assembly group is fitted in the case of conventional door latches by engaging the latch assembly group in a mounting opening of a mounting wall of the main body or of the door, usually without the use of additional screw connections. In conventional solutions, the latch assembly group, which owing to its configuration as a single coherent module is also referred to hereinbelow as a latch module, has a collar which extends around the insertion mouth and with which the latch module must be pushed through the mounting opening. In the finished fitted state, the collar projects beyond the mounting opening in the region of two opposing opening edges of the mounting opening, that is to say the extent of the collar is greater in that direction than the width of the mounting opening. In order nevertheless to be able to push the collar through the mounting opening, the latch assembly group must be tilted relative to the mounting wall. In this manner, a first portion of the collar can first be pushed through the mounting opening. An opposite second portion of the collar can then also be pushed through the mounting opening and the tilting of the latch assembly group can be reversed again. However, this method of pushing the collar through the mounting opening in a tilted manner requires the adjoining neck region beneath the collar to be narrower than the mounting opening. EP 1 418 266 A2 shows such a solution. In order that the latch module cannot slide along the mounting wall in the inserted state, that EP document provides positioning nubs on the latch module which engage into additional positioning holes of the mounting wall.

On the other hand, it is desirable that the neck region beneath the collar fills the mounting opening substantially completely in the finished mounted state. Additional positioning aids such as, for example, in the form of the positioning nubs of the mentioned EP document are then not required. In WO 2019/010020 A1, a solution is proposed in which, after the collar has been pushed through the mounting opening, a movable auxiliary member of the latch assembly group is pushed up into the remaining free space between the neck region and the opening edge of the mounting opening in order thus to fill the mounting opening completely.

However, the mentioned solutions according to EP 1 418 266 A2 and WO 2019/010020 A1 are comparatively complicated in terms of construction and correspondingly expensive to produce. The mounting operation itself is also comparatively laborious.

SUMMARY OF THE INVENTION

Accordingly, an object of the invention is to provide a door latch for a domestic electrical appliance which can be produced inexpensively and installed in a simple manner in the domestic appliance.

In order to achieve that object there is provided according to a first aspect of the invention a door latch for a domestic electrical appliance, comprising a latch module having an insertion mouth for receiving a closing member on closing of a door of the domestic appliance, two collar portions which are arranged opposite one another in a first direction on both sides of the insertion mouth and project away from one another, wherein collar undersides of the collar portions define a first positioning plane parallel to the first direction, support surfaces, separate from the collar portions, which define a second positioning plane parallel to the first positioning plane and at a distance beneath the first positioning plane, a first lateral wall beneath a first of the collar portions, wherein the first lateral wall is arranged laterally inwards from an outer collar edge of the first collar portion and extends as far as the collar underside of the first collar portion, and a second lateral wall beneath the second of the collar portions, wherein the second lateral wall is arranged laterally inwards from an outer collar edge of the second collar portion and extends as far as the collar underside of the second collar portion.

According to the invention, the second lateral wall has a first lateral wall sub-portion which extends as far as the collar underside of the second collar portion and points substantially sideways and, beneath the first lateral wall sub-portion, a second lateral wall sub-portion which is offset laterally inwards relative to the first lateral wall sub-portion and points substantially sideways, wherein the second lateral wall sub-portion is arranged at least partially and in particular wholly beneath the second positioning plane.

In this solution, the second lateral wall is constructed with different sub-portions which are offset inwards by different distances relative to the outer edge of the second collar portion. A first of these sub-portions of the second lateral wall advantageously lies directly beneath the second collar portion and is offset inwards to a lesser extent than is a second sub-portion of the second lateral wall, which lies beneath the first sub-portion. The second sub-portion of the second lateral wall allows the first collar portion to be pushed through a mounting opening in a mounting wall of the domestic appliance in a tilted position of the latch module in which the second collar portion has already previously been pushed through the mounting opening and the latch module is supported with the second sub-portion of the second lateral wall on an opening edge of the mounting opening. After the first collar portion has been pushed through the mounting opening, the latch module can be shifted along the mounting wall relative thereto until the first sub-portion of the second lateral wall is able to fall into the mounting opening. Because the first sub-portion is offset inwards relative to the outer edge of the second collar portion to a lesser extent than is the second sub-portion, play between the latch module and the mounting wall is reduced and in particular even largely eliminated along the mounting wall when the first sub-portion falls into the mounting opening. The solution according to the invention does not require additional positioning holes in the mounting wall for receiving separate positioning nubs of the latch module, as in EP 1 418 266 A2, for example, nor is a movable auxiliary member on the latch module required in order to fill a free space that remains between the latch module and the opening edge of the mounting opening, as in WO 2019/010020 A1.

The support surfaces of the latch module ensure that the latch module is held securely on the mounting wall in a direction perpendicular to the positioning planes after the first sub-portion of the second lateral wall has slid into the mounting opening. The presence of the support surfaces can have the result that, when the latch module is pivoted inwards with the aim of also moving the first collar portion through the mounting opening after the second collar portion has previously been pushed through the mounting opening, temporary elastic bending of the mounting wall occurs, caused by part of the support surfaces pressing against the mounting wall from beneath. The mounting wall relaxes, however, and returns to its unbent state when the first sub-portion of the second lateral wall then slides into the mounting opening.

In some embodiments, the transition between the first lateral wall sub-portion and the second lateral wall sub-portion of the second lateral wall is formed by a wall step in the second lateral wall. It is of course conceivable to make the transition between the first lateral wall sub-portion and the second lateral wall sub-portion smooth, that is to say without an angular transition.

In some embodiments, the second lateral wall sub-portion forms the pocket base of an insertion pocket which allows an opening edge of a mounting opening formed in a mounting wall of the domestic appliance to be inserted into the insertion pocket. An upper pocket wall of the insertion pocket can thereby be formed by a wall step of the second lateral wall which forms the transition between the first and the second lateral wall sub-portion, and a lower pocket wall of the insertion pocket can be formed by a third lateral wall sub-portion of the second lateral wall which adjoins the second lateral wall sub-portion therebeneath and extends obliquely outwards and downwards.

In some embodiments, the pocket base has a height, measured perpendicularly to the positioning planes, which corresponds at least approximately to the height of the first lateral wall sub-portion and is preferably substantially equal to the height of the first lateral wall sub-portion.

In some embodiments, the lateral offset of the second lateral wall sub-portion relative to the first lateral wall sub-portion corresponds at least approximately to the projecting length of the first collar portion over the first lateral wall and is preferably substantially equal to that projecting length.

In some embodiments, the first lateral wall sub-portion has a height, measured perpendicularly to the positioning planes, which is substantially equal to the distance between the two positioning planes.

In some embodiments, the latch module comprises at least one resilient biasing member which, in a state of minimal tension, projects upwards beyond the second positioning plane into the region between the two positioning planes and is resiliently deflectable downwards. The state of minimal tension is, for example, a relaxed state. The biasing member serves to reduce or even completely eliminate any loose movement play of the latch module perpendicularly to the mounting wall in the installed state.

In some embodiments, the biasing member, as seen in the first direction, projects beyond the second positioning plane at a point which lies between the two collar portions but closer to the second collar portion than to the first collar portion.

In some embodiments, the latch module comprises a module housing which has the insertion mouth and forms the collar portions, wherein the biasing member is formed by a flexible tongue which is formed integrally with the module housing and is clamped at one end or at both ends.

In some embodiments, the support surfaces form at least one support edge for the latch module. The support edge can form a pressure point at which the latch module presses against the mounting wall on pivoting of the first collar portion into and through the mounting opening and thereby causes temporary bending of the mounting wall. In some embodiments, the support edge, as seen in the first direction, is arranged at a point which is offset relative to a mid-point between the two collar portions towards the second collar portion. In this manner, a tilting moment acting on the latch module can be reduced or avoided if, with the door of the domestic appliance closed, the door is pulled and a force pressing the support surfaces against the underside of the mounting wall is thereby generated.

In some embodiments, a support edge is formed in front of and behind the collar portions as seen in a second direction parallel to the positioning planes and perpendicular to the first direction.

According to a further aspect, the invention provides a door latch for a domestic electrical appliance, comprising a latch module having a mouthpiece which delimits an insertion opening for a closing member which enters the insertion opening on closing of a door of the domestic appliance, a first recess beneath a first edge region of the mouthpiece, a second recess beneath a second edge region of the mouthpiece located diametrically opposite the first edge region beyond the insertion opening, where the first and the second edge region of the mouthpiece define a first positioning plane and the first and the second recess are configured for engagement by opposing opening edges of a mounting opening formed in a mounting wall of the domestic appliance, where the latch module has stationary support points for supporting the latch module on a wall underside of the mounting wall, where the stationary support points lie in a second positioning plane located at a distance beneath the first positioning plane and parallel thereto and—as seen in a direction from the second edge region to the first edge region of the mouthpiece—are arranged on the other side of the second recess and at least partially also on the other side of the first recess, where the second recess has a region of smaller depth between the two positioning planes and a region of greater depth beneath the second positioning plane, and where the latch module has at least one resiliently movable support point, projecting into the space between the two positioning planes, for supporting the latch module on the wall underside of the mounting wall, wherein the resiliently movable support point—as seen in the direction from the second edge region to the first edge region of the mouthpiece—lies in front of a mid-point between the two recesses.

In some embodiments, the resiliently movable support point can at the same time form a pressure point at which the latch module presses against the mounting wall on pivoting of the first edge region of the mouthpiece through the mounting opening and causes temporary bending of the mounting wall. In such embodiments, the stationary support points can have solely a positioning function for the latch module relative to the mounting wall, without exerting a bending action on the mounting wall on pushing of the mouthpiece through the mounting opening. In other embodiments, on the other hand, the resiliently movable support point can be so spring-soft that it is unable to exert a relevant bending action on the mounting wall. In such a case, the stationary support points can include at least one support point (for example in the form of a support edge) which has a bending action on the mounting wall.

There is additionally provided according to the invention a method for mounting a door latch of the first aspect outlined above on a mounting wall of a domestic electrical appliance, wherein a mounting opening for the latch module of the door latch is formed in the mounting wall, wherein the mounting opening has two opposing opening edges which are at a distance from one another which corresponds substantially to the distance between the first lateral wall and the first lateral wall sub-portion of the second lateral wall. In the method, the second collar portion is first guided through the mounting opening and moved over one of the two opening edges of the mounting opening so that the one of the opening edges is in contact with the second lateral wall sub-portion of the second lateral wall. The latch module is then tilted relative to the mounting wall, with temporary elastic bending of the mounting wall and with continued contact of the one of the opening edges on the second lateral wall sub-portion, until the first collar portion passes through the mounting opening past the other of the opening edges. The latch module is then shifted in the direction towards the other of the opening edges in order to move the first collar portion over the other of the opening edges until the one of the opening edges snaps in front of the first lateral wall sub-portion of the second lateral wall owing the action of a spring return force.

In some embodiments, the spring return force results at least in part from the elastic bending of the mounting wall or/and at least in part from elastic deformation of a resilient biasing member of the latch module.

The invention will be explained further hereinbelow with reference to the accompanying drawings.

DETAILED DESCRIPTION OF THE INVENTION

Figure 1:
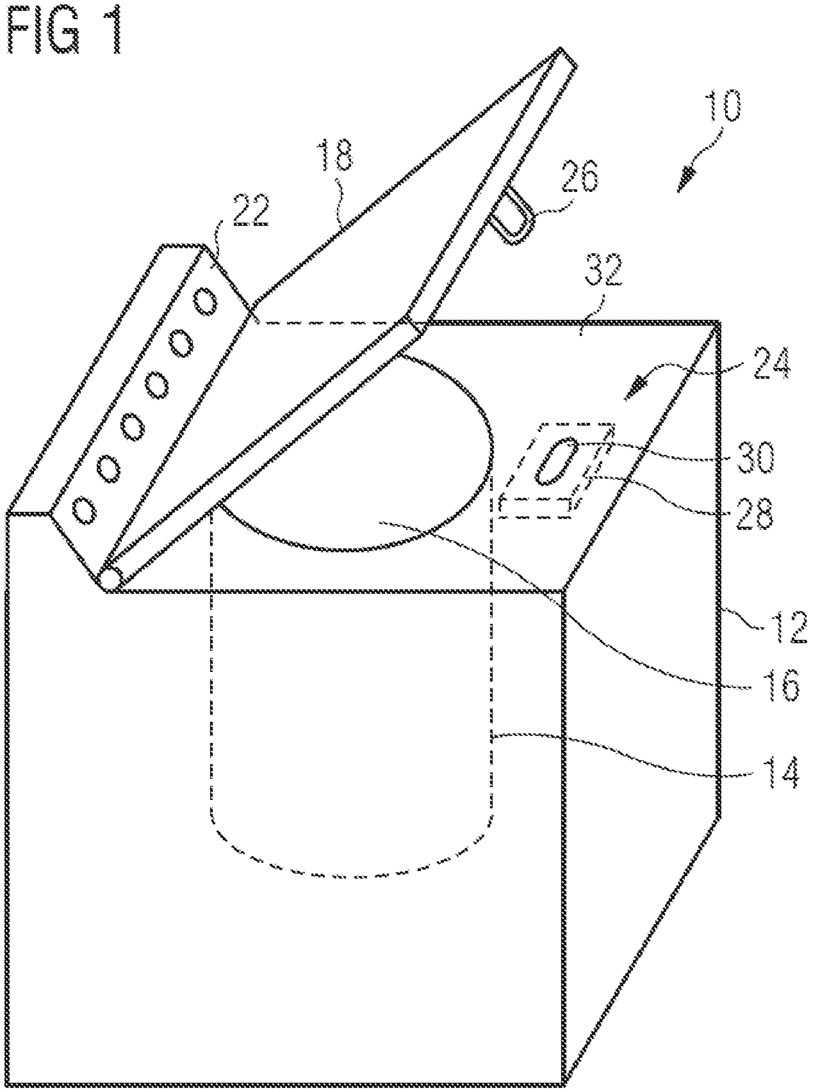
FIG. 1 is a perspective view, in schematic form, of a domestic washing machine according to an exemplary embodiment.

Reference will first be made to FIG. 1. The domestic washing machine shown therein, which is designated generally 10, is of the top-loader type in the example shown, but that is not important within the scope of the present disclosure since the invention can equally be used in door latches for domestic washing machines of the front-loader type and also in other types of domestic electrical appliance, for example in dishwashers, tumble dryers or baking ovens, to mention only a few examples. The washing machine 10 comprises a machine main body (appliance main body) 12 in which there is accommodated a liquor container 14 indicated schematically by a broken line. A washing drum (not shown) is rotatably mounted in the liquor container 14 in a manner known per se, which drum forms a working chamber (washing chamber) of the washing machine 10. This washing chamber is accessible through an access opening 16 which, in the case of the top-loader washing machine 10 shown in FIG. 1, is formed on the upper side of the machine main body 12. A lid 18 which is pivotably mounted on the machine main body 12 can be pivoted upwards in order to free the access opening 16, and can also be folded down so that the lid 18 lies horizontally on the machine main body 12 and blocks the access opening 16. On a control panel 22 there are provided various operating elements and display elements which serve as a control interface of the washing machine for the user and allow the user to set different wash programs, for example.

A door latch designated generally 24 serves to hold the lid 18 closed, that is to say when it has been folded down onto the machine main body 12, which door latch comprises as two fundamental components a closing element 26 and a latch assembly group 28, which is also referred to hereinbelow as a latch module. The closing element 26 and the latch module 28 cooperate, on closing of the lid 18, in that the closing element 26 enters an insertion mouth 30 of the latch module 28 and is secured against lifting out of the insertion mouth 30 by a movably arranged securing element which is contained in the latch module 28 and not shown in detail in FIG. 1. The engagement of the closing element 26 with the securing element holds the lid 18 closed. In the example shown, the closing element 26 is mounted on the lid 18, while the latch module 28 is attached to the machine main body 12, specifically to an upper housing wall 32 of the machine main body 12 which serves as a mounting wall for the latch module 28. It will be appreciated that the pattern of arrangement of the closing element 26 and the latch module 28 can be reversed, that is to say the closing element 26 can be mounted on the machine main body 12 while the latch module 28 can be attached to a suitable wall portion of the lid 18 serving as the mounting wall.

The mentioned securing element in the latch module 28, which is to cooperate with the closing element 26, can be formed, for example, by a rotatably mounted gripping member which is constructed with a gripping mouth formed by two opposing gripping jaws and which the closing member 26 (which in such a case can be in the form of a closing shackle) enters on closing of the lid 18 and thereby sets the gripping member in rotation, whereby the closing member 26 is caught in the gripping mouth of the gripping member. In the field of door latches for domestic washing machines, such rotatable gripping members for catching and holding a closing shackle are known per se among experts, so that a more detailed explanation can be dispensed with. Reference may be made by way of example to DE 198 37 248 A1.

The lid 18 forms a door within the meaning of the present disclosure. Any form of lid, flap or other movable, in particular pivotable, element which is able to selectively block and free an access to a working chamber of a domestic electrical appliance is to be understood as being a door within the meaning of the present disclosure.

Figure 2A:
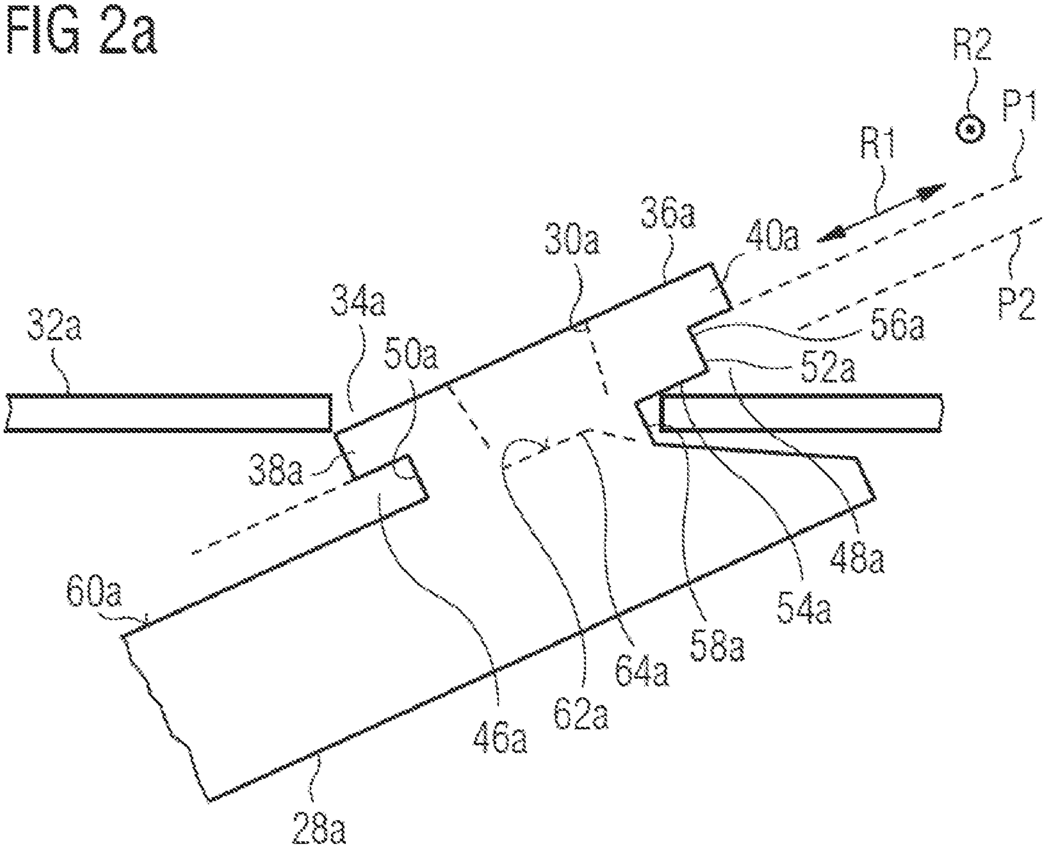
FIGS. 2*a*, 2*b* show, schematically, phases during the installation of a latch module of a door latch of a domestic electrical appliance in a mounting wall of the domestic appliance.
Figure 2B:
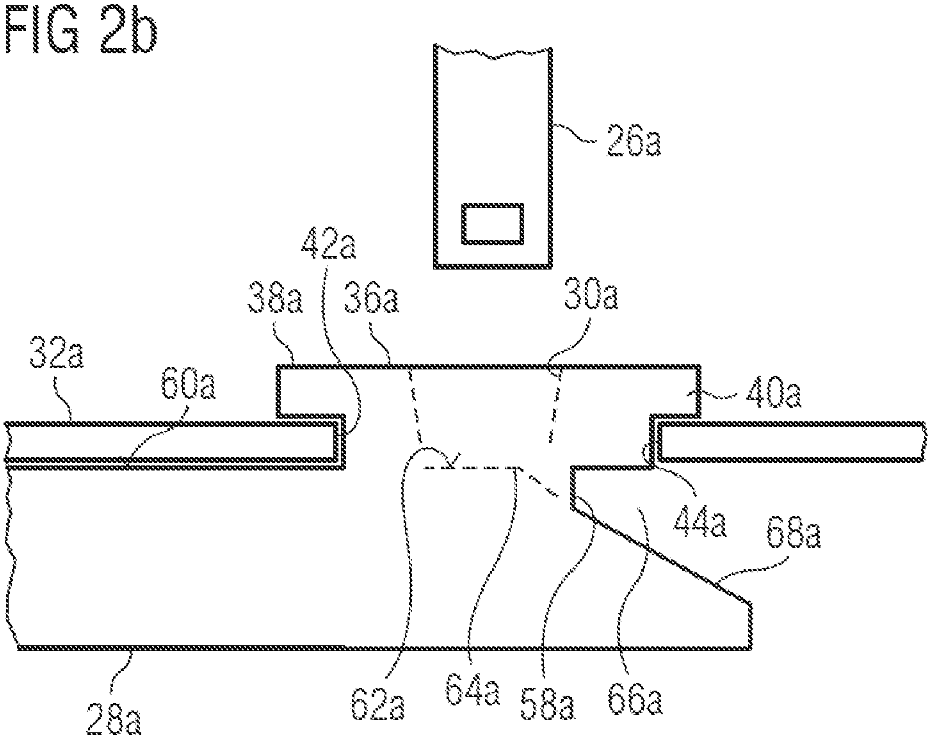

Before FIGS. 2*a*, 2*b* are next discussed, it is pointed out generally that, in all the figures, components which are the same or have the same action are provided with the same reference numerals, with the addition of a lowercase letter from FIGS. 2*a*, 2*b* onwards. For the explanation of such components which are the same or have the same action, the first comments made apply, unless specified otherwise thereafter.

FIGS. 2*a*, 2*b* show, in highly schematic form, phases in the mounting of a latch module 28*a* on a mounting wall 32*a*, which can be, for example, the upper housing wall 21 of the washing machine 10 of FIG. 1. The mounting wall 32*a* has a mounting hole 34*a*, framed on all sides, which has a quadrilateral outline, for example, when the mounting wall 32*a* is seen from above. The latch module 28*a* has an insertion mouth 30*a*, indicated only by a broken line in FIGS. 2*a*, 2*b*, which is formed in a mouthpiece 36*a* of the latch module 28*a*. A closing member 26*a* (FIG. 2*b*) in the form of a closing shackle, for example, enters the insertion mouth 30*a* (which can also be referred to as an insertion opening) on closing of the door of a domestic appliance which has the mounting wall 32*a* and is equipped with the latch module 28*a*. FIG. 2*a* shows an intermediate phase in the mounting of the latch module 28*a* on the mounting wall 32*a*, FIG. 2*b* shows the finished mounted state.

The mouthpiece 36*a* forms a first collar portion 38*a* and a second collar portion 40*a*. The two collar portions 38*a*, 40*a*, which can also be referred to as the first and second edge region of the mouthpiece 36*a*, respectively, lie opposite one another in a first direction R1 indicated in FIG. 2*a* on both sides of the insertion mouth 30*a* and project away from one another. With their collar undersides, the two collar portions 38*a*, 40*a* define a first positioning plane P1 (FIG. 2*a*), which is oriented parallel to the first direction R1. The undersides of the collar portions 38*a*, 40*a* have a positioning function in that, in the finished mounted state according to FIG. 2*b*, they project over a respective opening edge 42*a* or 44*a* of the mounting opening 34*a* and provide contact surfaces located on both sides of the insertion mouth 30*a* for the upper side of the mounting wall 32*a*.

Beneath the first collar portion 38*a* there is formed on the latch module 28*a* a first recess 46*a*, and beneath the second collar portion 40*a* there is formed on the latch module 28*a* a second recess 48*a*. The base (bottom) of the recess 46*a* is formed by a first lateral wall 50*a*, which is offset inwards relative to the outer collar edge of the first collar portion 38*a* and extends as far as the underside of the first collar portion 38*a*. Unlike the first recess 46*a*, which can be referred to as a single-step recess, the second recess 48*a* is in multi-step form and is delimited by a second lateral wall 52*a* which has two sub-portions 56*a*, 58*a* separated by a stepped shoulder 54*a*. The sub-portion 56*a* of the second lateral wall 52*a* can be referred to as a first lateral wall sub-portion and the sub-portion 58*b* can be referred to as a second lateral wall sub-portion. Based on the outer collar edge of the second collar portion 40*a*, the second lateral wall sub-portion 58*a* is offset laterally inwards to a greater extent than is the first lateral wall sub-portion 56*a*. The first lateral wall sub-portion 56*a* extends as far as the underside of the second collar portion 40*a* and in the example shown has substantially the same height as the first lateral wall 50*a*. By means of the two lateral wall sub-portions 56*a*, 58*a*, regions of different depth (measured inwards) are formed in the second recess 48*a*, namely a region of comparatively smaller depth delimited by the first lateral wall sub-portion 56*a* and a region of comparatively greater depth delimited by the second lateral wall sub-portion 58*a*.

At a distance beneath the first positioning plane P1, the latch module 28*a* defines a second positioning plane P2 (FIG. 2*a*) which is parallel to the first positioning plane P1. The second positioning plane P2 is formed by support surfaces 60*a*, 62*a* which serve to support the latch module 28*a* on the underside of the mounting wall 32*a*. Where mention is made here of above and beneath or of an upper side and an underside, these expressions refer to the representation in FIGS. 2*a*, 2*b*, in which the latch module 28*a* is inserted from beneath into the mounting opening 34*a* of the mounting wall 32*a*. It will be appreciated that with an inverted orientation of the latch module 28*a* and the mounting wall 32*a*, the expressions top, bottom, upper side, underside used are to be transposed accordingly.

A portion of the support surfaces 60*a*, 62*a*, in the case of FIG. 2*a* the support surface(s) 60*a*, is—as seen in the first direction R1—formed remote from the mouthpiece 36*a* on the upper side of the latch module 28*a*, and another part, in FIG. 2*a* the support surface(s) 62*a* is, in contrast, arranged within the region of the mouthpiece 36*a* and is located—as seen in a second direction R2 perpendicular to the first direction R1 and parallel to the positioning planes P1, P2 (perpendicular to the plane of the drawing of FIG. 2*a*)—in front of and/or behind the mouthpiece 36*a*. For example, the latch module 28*a* forms two support surfaces 62*a*, of which one is arranged in front of the mouthpiece 36*a* and the other behind the mouthpiece 36*a* as seen in the second direction R2.

The support surface(s) 62*a* forms or form a support edge 64*a* which lies in the positioning plane P2 and which, on installation of the latch module 28*a* in the mounting opening 34*a* of the mounting wall 32*a*, presses from beneath against the mounting wall 32*a* and effects temporary reversible bending of the mounting wall 32*a*.

In some embodiments, the support surfaces 60*a*, 62*a* are formed by a one-piece housing part of the latch module 28*a* which at the same time forms the mouthpiece 36*a*. The support surfaces 60*a*, 62*a* form stationary support points for supporting the latch module 28*a* on the underside of the mounting wall 32*a*, that is to say they do not have appreciable resilience with which any movement play between the latch module 28*a* and the mounting wall 32*a* in the finished installed state corresponding to FIG. 2*b* in the direction perpendicular to the positioning planes P1, P2 could be reduced or eliminated. In order to avoid such play movements, additional spring elements are provided on the latch module in the exemplary embodiment of FIGS. 3*a*, 3*b* yet to be described hereinbelow, which additional spring elements are also conceivable in the exemplary embodiment of FIGS. 2*a*, 2*b* shown in schematic form but are not shown in the drawing. If such a spring element is also to be provided in the exemplary embodiment of FIGS. 2*a*, 2*b*, it projects beyond the positioning plane P2 in the direction towards the positioning plane P1, that is to say it projects into the space between the two positioning planes P1, P2.

The distance of the support surfaces 60*a*, 62*a* from the undersides of the collar portions 38*a*, 40*a* determines the distance between the two positioning planes P1, P2. This distance of the two positioning planes P1, P2 from one another is such that it corresponds at least to the thickness of the mounting wall 32*a* and is optionally slightly larger, wherein in the latter case one or more suitable spring elements can be provided on the latch module 28*a*—as explained—in order to avoid any movement play between the mounting wall 32*a* and the latch module 28*a*. If, as a numerical example, a wall thickness of the mounting wall 32*a* of approximately 0.7 mm is assumed, the distance between the two positioning planes P1, P2 could be, for example, approximately 0.75 or 0.80 mm.

In the example shown, the second lateral wall sub-portion 58*a* of the second recess 48*a* lies wholly beneath the second positioning plane P2, that is to say outside the space delimited between the two positioning planes P1, P2. In the example shown, the stepped shoulder 54*a* lies substantially in the positioning plane P2. The height of the second lateral wall sub-portion 58*a* (measured in a direction perpendicular to the positioning planes P1, P2) corresponds in the example shown at least to the wall thickness of the mounting wall 32*a* and in some circumstances may even be slightly larger. Because the second lateral wall sub-portion 58*a* is offset backwards relative to the first lateral wall sub-portion 56*a*, an insertion pocket 66*a* (FIG. 2*b*) is formed in the second recess 48*a*, the pocket base of which insertion pocket is formed by the second lateral wall sub-portion 58*a*. The stepped shoulder 54*a* forms an upper pocket wall of the insertion pocket 66*a*, and a lower pocket wall is formed by a third lateral wall sub-portion 68*a* (FIG. 2*b*) of the second lateral wall 52*a* which adjoins the second lateral wall sub-portion 58*a* therebeneath and extends obliquely outwards and downwards. This oblique configuration of the third lateral wall sub-portion 58*a* ensures the necessary free space in the insertion pocket 66*a* for the insertion of the second opening edge 44*a* of the mounting wall 32*a* into the insertion pocket 66*a* in a tilted orientation of the latch module 28*a* (see FIG. 2*a*).

The extent to which the second lateral wall sub-portion 58*a* is offset relative to the first lateral wall sub-portion 56*a* of the second lateral wall 52*a*, in other words the length, measured in the first direction R1, of the stepped shoulder 54*a*, is at least as great as the backward offset of the lateral wall 50*a* relative to the outer collar edge of the first collar portion 58*a*. In the example shown, the backward offset of the second lateral wall sub-portion 58*a* relative to the first lateral wall sub-portion 56*a* is shown even slightly larger than the backward offset of the first lateral wall 50*a* relative to the outer collar edge of the first collar portion 34*a*. The size of the backward offset of the second lateral wall sub-portion 58*a* relative to the first lateral wall sub-portion 56*a* can be equated with the depth, measured starting from the first lateral wall sub-portion 56*a*, of the insertion pocket 66*a*. Correspondingly, the backward offset of the first lateral wall 50*a* relative to the outer collar edge of the first collar portion 34*a* can be equated with the depth, measured starting from the outer collar wall of the first collar portion 34*a*, of the first recess 46*a*. By making the insertion pocket 66*a* at least as deep as the first recess 46*a* and in particular even slightly deeper, it can be ensured that in the situation shown in FIG. 2*a*, in which the second opening edge 44*a* of the mounting opening 34*a* extends into the insertion pocket 66*a* and is in contact with the second lateral wall sub-portion 58*a*, the first collar portion 34*a* can be pivoted upwards through the mounting opening 32*a* at the first opening edge 42*a* of the mounting opening 34*a*.

In order to install the latch module 28*a* on the mounting wall 32*a*, the latch module 28*a* is brought up to the mounting wall 32*a* from beneath and brought into an oblique position relative to the mounting wall 32*a* in the manner shown in FIG. 2*a*. In this oblique position, the second collar portion 40*a* can be guided through the mounting opening 34*a* and moved on the upper side of the mounting wall 32*a* over the second opening edge 44*a* of the mounting opening 34*a*. The second opening edge 44*a* of the mounting wall 32*a* thereby enters the second recess 48*a*. The mounting person must ensure that the second opening edge 44*a* enters the insertion pocket 66*a*, as shown in FIG. 2*a*, and does not hook directly beneath the second collar portion 40*a* in front of the first lateral wall sub-portion 56*a*. Starting from the state so achieved corresponding to FIG. 2*a*, the mounting person must pivot the latch module 28*a* so that the first collar portion 38*a* moves through the mounting opening 34*a* until the first collar portion 38*a* has moved past the first opening edge 42*a* of the mounting opening 34*a* completely. The second opening edge 44*a* remains caught to a certain extent in the insertion pocket 66*a* during this pivoting movement. During the pivoting movement, temporary bending of the mounting wall 32*a* can occur, as already explained, because the support edge(s) 64*a* presses or press against the underside of the mounting wall 32*a*.

After the first collar portion 38*a* has been pivoted past the first opening edge 42*a* through the mounting opening 34*a*, the latch module 28*a* can be shifted along the mounting wall 32*a*, that is to say in the first direction R1, to the first opening edge 42*a* so that the first opening edge 42*a* penetrates increasingly more deeply into the first recess 46*a*. The second opening edge 44*a* thereby gradually moves out of the insertion pocket 66*a*. As soon as the second opening edge 44*a* has passed the stepped shoulder 54*a* completely, the first lateral wall sub-portion 56*a* is able to snap downwards into the mounting opening 32 in front of the second opening edge 44*a*. This snap movement can be driven at least in part by the flexural stress which the mounting wall 32 develops as a result of the mentioned temporary bending. The finished mounted state according to FIG. 2*b* is then reached.

Looking at FIG. 2*b*, it will be seen that the support edge 64*a*, based on a notional mid-point between the two collar portions 38*a*, 40*a*, is offset in the direction towards the second collar portion 40*a*. In other words, the support edge 64*a* is offset in the direction towards the second collar portion 40*a* relative to a mid-point, seen in the first direction R1, of the insertion mouth 30*a*. The support surfaces 60*a*, on the other hand, are arranged offset in the direction towards the first collar portion 38*a* in relation to that notional mid-point. The latch module 28*a* accordingly has support points on both sides of the mentioned notional mid-point. Therefore, if a tensile force is exerted via the closing member 26 on the latch module 28*a* while the domestic appliance is in use, there is no or only a comparatively small tilting moment on the latch module 28*a*. The latch module 28*a* is therefore not at risk of unintentionally being tilted out of the mounting opening 34*a* to a certain extent.

Reference will now be made to the exemplary embodiment of FIGS. 3*a*, 3*b*. In this exemplary embodiment, the latch module 28*b* has a housing part 70*b* which forms the mouthpiece 36*b* and, in the second direction R2, on both sides of the mouthpiece 36*b*, a spring tongue 72*b*. The spring tongues 72*b* project, as can be seen in FIG. 3*b*, beyond the second positioning plane P2 and serve to compensate for play between the latch module 28*b* and a mounting wall in a direction perpendicular to the positioning planes P1, P2. In the example shown, the spring tongues 72*b* are connected in one piece to adjacent regions of the housing part 70*b* at both tongue ends and have maximum elastic deflectability in the region of their tongue middle. It will be appreciated that, instead of such spring tongues which are clamped at both ends, it is also possible as an alternative for one or more spring tongues that are clamped only in the region of one tongue end to be formed by the housing part 70*b*.

Figure 3A:
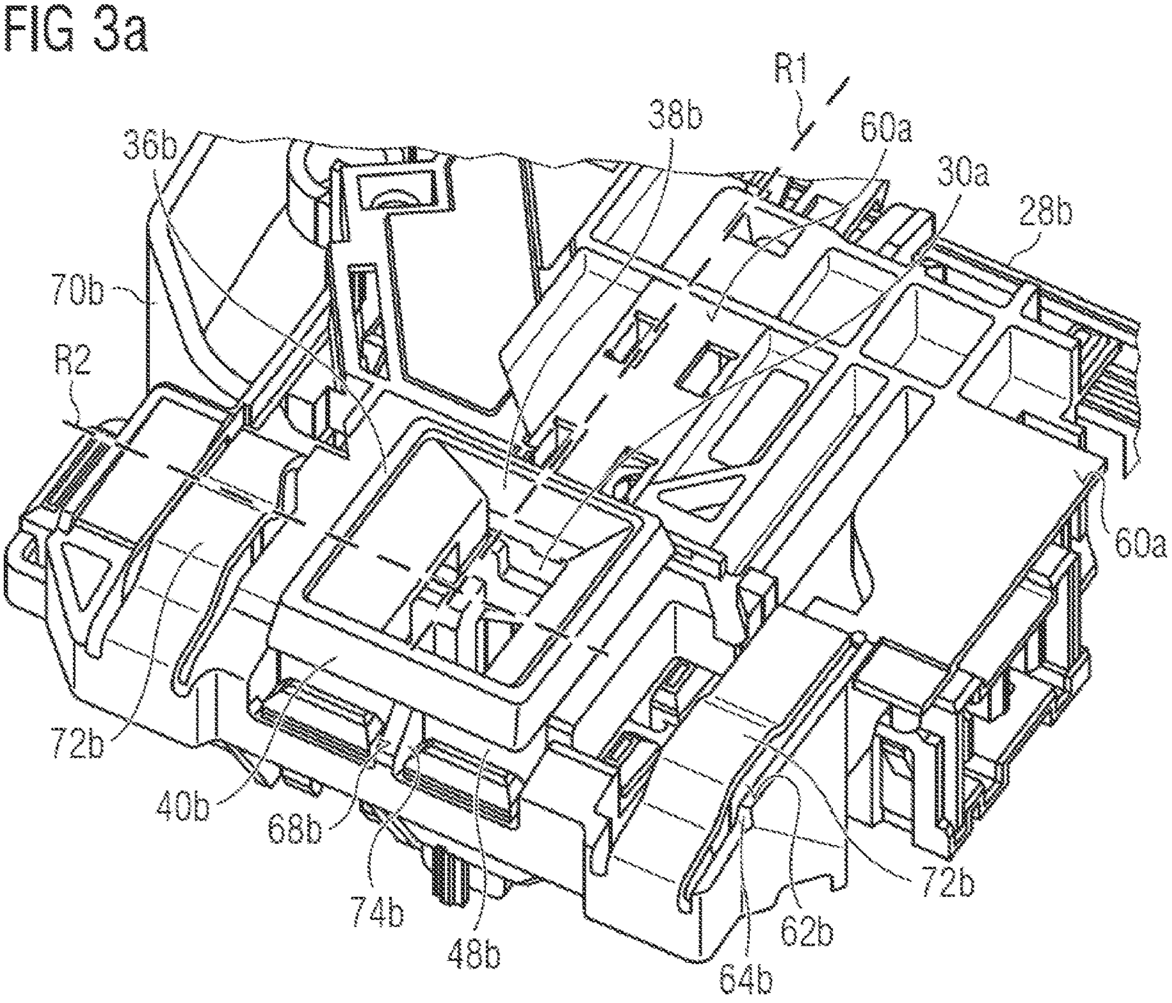
FIG. 3*a* is a perspective view of a detail of a latch module of a door latch according to an exemplary embodiment which is more true to reality.
Figure 3B:
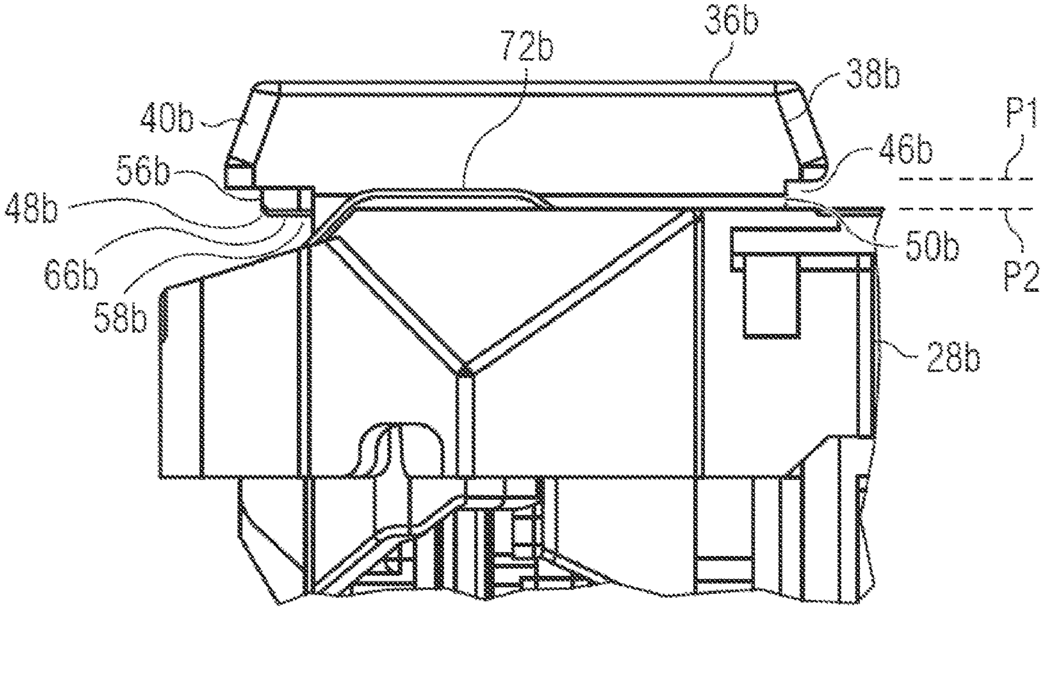
FIG. 3*b* is a lateral plan view of a detail of the latch module of FIG. 3*a* having a mouthpiece.

It will further be seen in FIG. 3*a* that the third lateral wall sub-portion 68*a* is formed by a comparatively thin rib portion 74*b* which is formed beneath the second collar portion 40*b* by the housing part 70*b*.

Figure 4A:
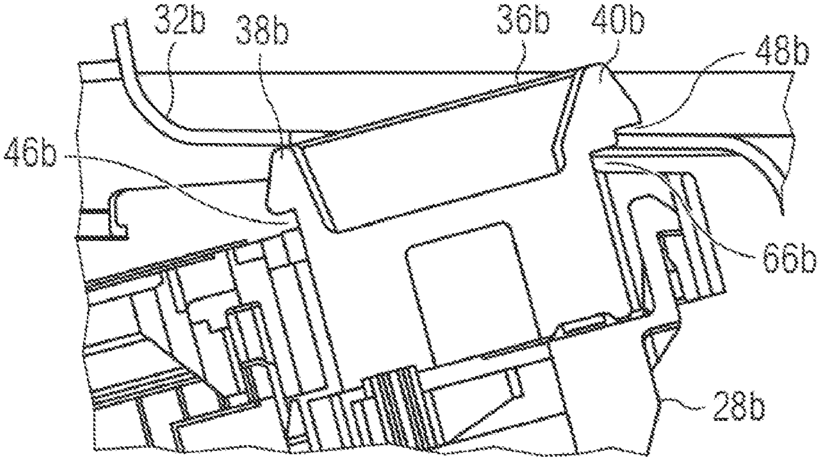
FIG. 4*a* shows an error-prone attempt to install the latch module of FIGS. 3*a*, 3*b* in a mounting wall.
Figure 4B:
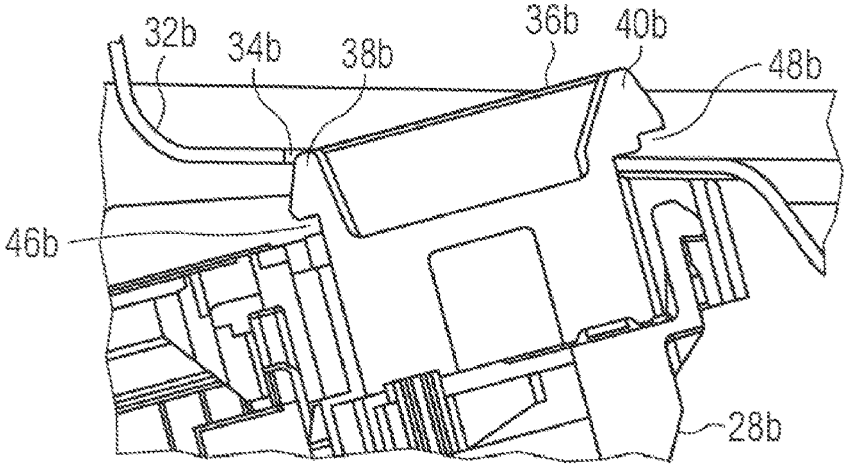
FIGS. 4*b* to 4*e* show successive phases of a correct procedure for installing the latch module of FIGS. 3*a*, 3*b* in a mounting wall.
Figure 4C:
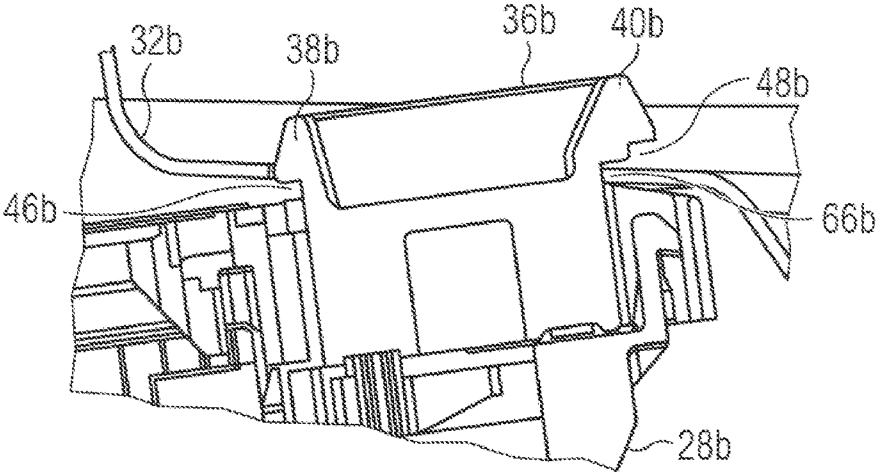
Figure 4D:
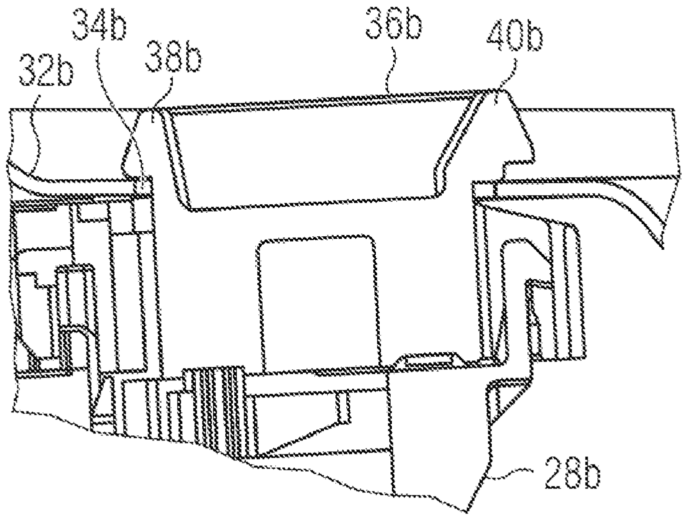

FIG. 4*a* illustrates the situation when, during mounting on a mounting wall 32*b*, the latch module 28*b* of FIGS. 3*a*, 3*b* is first threaded through the mounting opening 34*b* in such a manner that the second opening edge 44*b* of the mounting opening 34*b* does not enter the insertion pocket 66*b* but is hooked in front of the first lateral wall sub-portion 56*b*. The first collar portion 38*b* then cannot be moved through the insertion opening 34*b* but strikes the first opening edge 42*b*.

Figure 4E:
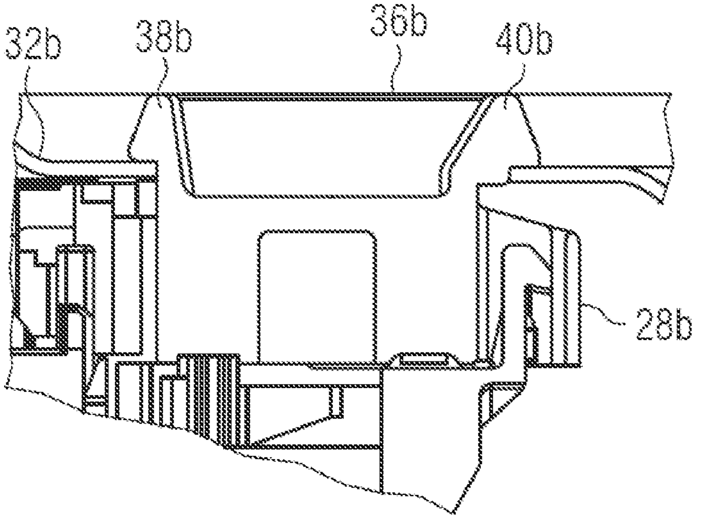

In contrast, FIGS. 4*b* to 4*e* illustrate a correct mounting procedure, in which the second opening edge 44*b* first enters the insertion pocket 66*b* (FIG. 4*b*), then the latch module 28*b* is pivoted in order to move the first collar portion through the mounting opening 34*b* (FIGS. 4*c*, 4*d*), and then the latch module 28*b* is shifted sideways in order that the first lateral wall sub-portion 56*b* is able to spring into the mounting opening 34*b* (FIG. 4*e*).

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A door latch for a domestic electrical appliance, comprising a latch module comprising:

an insertion mouth for receiving a closing member on closing of a door of the domestic electrical appliance;

two collar portions which are arranged opposite one another in a first direction on both sides of the insertion mouth and project away from one another, wherein collar undersides of the collar portions define a first positioning plane parallel to the first direction;

support surfaces, separate from the collar portions, which define a second positioning plane parallel to the first positioning plane and at a distance beneath the first positioning plane;

a first lateral wall beneath a first collar portion of the two collar portions, wherein the first lateral wall is arranged laterally inwards from an outer collar edge of the first collar portion and extends as far as the collar underside of the first collar portion; and a second lateral wall beneath a second collar portion of the two collar portions, wherein the second lateral wall is arranged laterally inwards from an outer collar edge of the second collar portion and extends as far as the collar underside of the second collar portion, wherein the second lateral wall further comprises:

a first lateral wall sub-portion which extends as far as the collar underside of the second collar portion and points substantially sideways; and a second lateral wall sub-portion beneath the first lateral wall sub-portion, the second lateral wall sub-portion being offset laterally inwards relative to the first lateral wall sub-portion and pointing substantially sideways, wherein the second lateral wall sub-portion is arranged at least partially beneath the second positioning plane, wherein the second lateral wall sub-portion forms a pocket base of an insertion pocket which allows an opening edge of a mounting opening formed in a mounting wall of the domestic appliance to be inserted into the insertion pocket, wherein an upper pocket wall of the insertion pocket is formed by a wall step of the second lateral wall which forms a transition between the first and the second lateral wall sub-portions, and a lower pocket wall of the insertion pocket is formed by a third lateral wall sub-portion of the second lateral wall which adjoins the second lateral wall sub-portion therebeneath and extends obliquely outwards and downwards, the door latch comprising a first support surface and a second support surface, wherein the second support surface extends between first and second opposed ends, wherein the second end defines a support edge, wherein the first support surface and the first end are arranged offset in a direction toward the first collar portion in relation to the mid-point.

2. The door latch according to claim 1, wherein the transition between the first lateral wall sub-portion and the second lateral wall sub-portion of the second lateral wall is formed by a wall step in the second side wall.

3. The door latch according to claim 1, wherein the pocket base has a height, measured perpendicularly to the positioning planes, which corresponds at least approximately to the height of the first lateral wall sub-portion and is preferably substantially equal to the height of the first lateral wall sub-portion.

4. The door latch according to claim 1, wherein the lateral offset of the second lateral wall sub-portion relative to the first lateral wall sub-portion corresponds at least approximately to the projecting length of the first collar portion over the first lateral wall and is preferably substantially equal to that projecting length.

5. The door latch according to claim 1, wherein the first lateral wall sub-portion has a height, measured perpendicularly to the positioning planes, which is substantially equal to the distance between the two positioning planes.

6. The door latch according to claim 1, wherein the latch module comprises at least one resilient biasing member which, in a state of minimal tension, projects upwards beyond the second positioning plane into the region between the two positioning planes and is resiliently deflectable downwards.

7. The door latch according to claim 6, wherein the biasing member, as seen in the first direction, projects beyond the second positioning plane at a point which lies between the two collar portions but closer to the second collar portion than to the first collar portion.

8. The door latch according to claim 6, wherein the latch module comprises a module housing which has the insertion mouth and forms the collar portions, wherein the biasing member is formed by a flexible tongue which is formed by the module housing.

9. The door latch according to claim 1, wherein the support edge, as seen in the first direction, is located at a point which is offset relative to a mid-point between the two collar portions towards the second collar portion.

10. The door latch according to claim 1, wherein a support edge is formed in front of and behind the collar portions as seen in a second direction parallel to the positioning planes and perpendicular to the first direction.

11. A door latch for a domestic electrical appliance, comprising a latch module comprising:

a mouthpiece which delimits an insertion opening for a closing member which enters the insertion opening on closing of a door of the domestic appliance;

a first recess beneath a first edge region of the mouthpiece; and a second recess beneath a second edge region of the mouthpiece located diametrically opposite the first edge region beyond the insertion opening, wherein the first and the second edge region of the mouthpiece define a first positioning plane and the first and the second recess are configured for engagement by opposing opening edges of a mounting opening formed in a mounting wall of the domestic appliance, wherein the latch module has stationary support points for supporting the latch module on a wall underside of the mounting wall, wherein the stationary support points lie in a second positioning plane located at a distance beneath the first positioning plane and parallel thereto and—as seen in a direction from the second edge region to the first edge region of the mouthpiece—are arranged on the other side of the second recess and at least partially also on the other side of the first recess, wherein the second recess has a region of smaller depth between the two positioning planes and a region of greater depth beneath the second positioning plane, wherein the latch module has at least one resiliently movable support point, projecting into the space between the two positioning planes, for supporting the latch module on the wall underside of the mounting wall, wherein the resiliently movable support point—as seen in the direction from the second edge region to the first edge region of the mouthpiece—lies in front of a mid-point between the two recesses, wherein a second lateral wall sub-portion forms a pocket base of an insertion pocket which allows an opening edge of a mounting opening formed in a mounting wall of the domestic appliance to be inserted into the insertion pocket, wherein an upper pocket wall of the insertion pocket is formed by a wall step of a second lateral wall which forms a transition between a first and the second lateral wall sub-portion, and a lower pocket wall of the insertion pocket is formed by a third lateral wall sub-portion of the second lateral wall which adjoins the second lateral wall sub-portion therebeneath and extends obliquely outwards and downwards, the door latch comprising a first support surface and a second support surface, wherein the second support surface extends between first and second opposed ends, wherein the second end defines a support edge, wherein the first support surface and the first end are arranged offset in a direction toward the first collar portion in relation to the mid-point.

* * * * *